United States Patent Office 3,037,350
Patented June 5, 1962

3,037,350
RAMJET FUEL CONTROL
Warren H. Cowles, Detroit, and Joseph M. Ladd, Warren, Mich., assignors to Holley Carburetor Company, Van Dyke, Mich., a corporation of Michigan
Filed Apr. 15, 1959, Ser. No. 806,592
6 Claims. (Cl. 60—39.28)

This invention relates generally to fuel controls, and more specifically to fuel controls for ramjet engines.

A ramjet engine, by nature, is particularly suited to high speed and high altitude aircraft. For this reason, not only has the ramjet engine been used for manned aircraft, but it is also gaining importance in the field of unmanned guided missiles.

Accordingly, it is now proposed to provide a fuel control for a ramjet engine which is readily adaptable to both applications of manned aircraft and guided missiles. Realizing that guided missiles are within the category of expendable items, it is a further object of this invention to provide a fuel control which is easily and economically constructed.

Other objects and advantages will become apparent when reference is made to the specification and the following list of illustrations, wherein:

FIGURE 4 is a further modification of the invention.

FIGURE 5 is a fragmentary cross-sectional illustration in enlarged scale of one of the elements illustrated in FIGURE 2.

Figure 1:
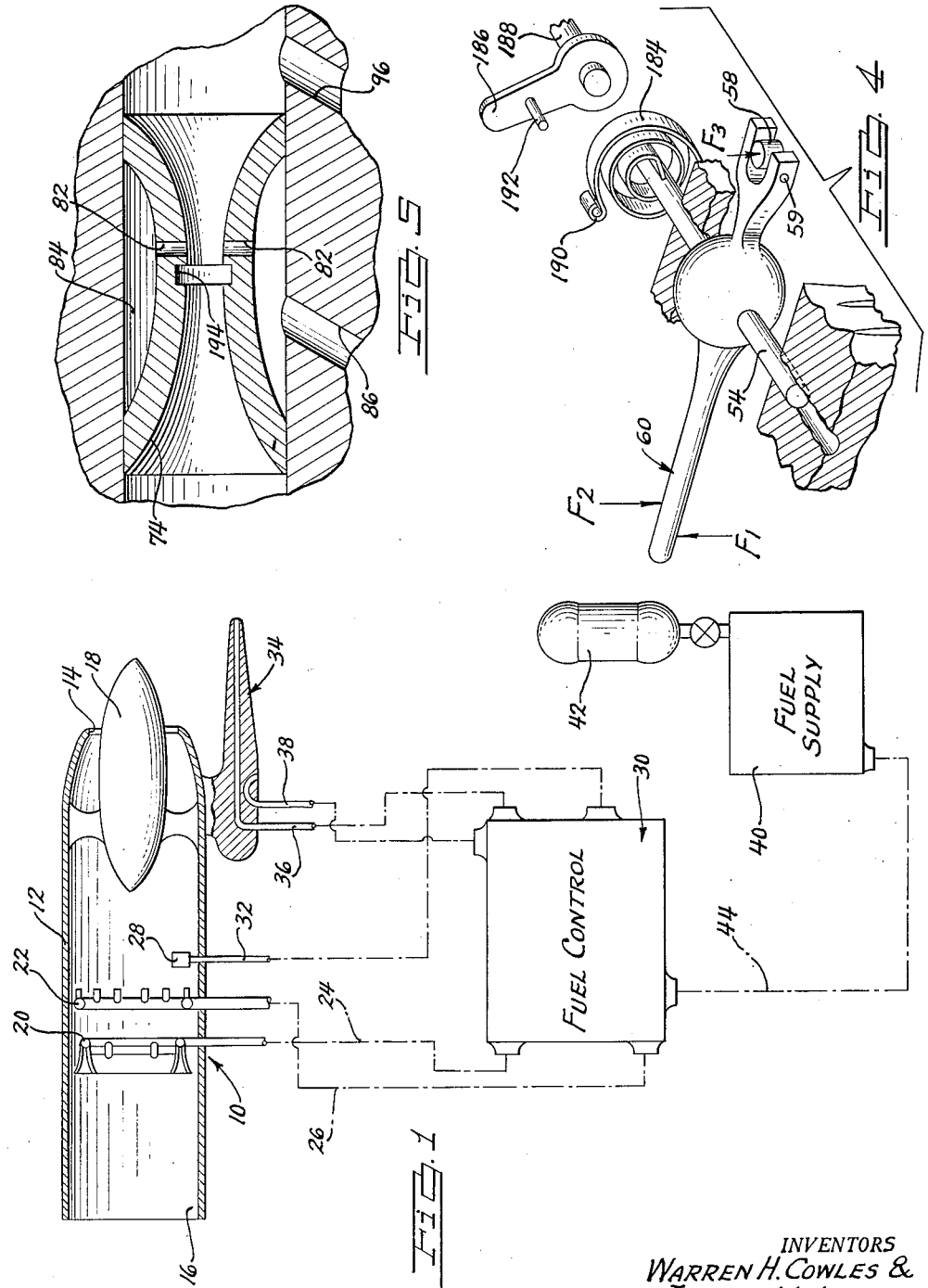
FIGURE 1 is a schematic illustration of a ramjet engine equipped with a fuel control constructed in accordance with the teachings of the invention.

Referring now in greater detail to the drawings, FIGURE 1 illustrates a ramjet engine 10, having a housing 12 with an air intake 14 and exhaust nozzle 16. A burner section located generally between the diffuser 18 and exhaust nozzle 16 contains a primary fuel burner ring 20 and a secondary fuel burner 22. The primary burner may actually have the added secondary function of acting as a flame holder. Metered fuel can, of course, be supplied to the burners 20 and 22 by any suitable means such as conduits 24 and 26.

A burner pressure probe 28 senses and transmits burner pressure to the fuel control 30 as by conduit 32; the total ambient pressure, $Pt$, and the static ambient pressure, $Ps$, are sensed by an external probe schematically illustrated at 34 and transmitted to the control 30 by means of conduits 36 and 38 respectively.

A fuel source 40, which may be pressurized as by a compressed air tank 42, supplies unmetered fuel to the control 30 through conduit 44.

Figure 2:
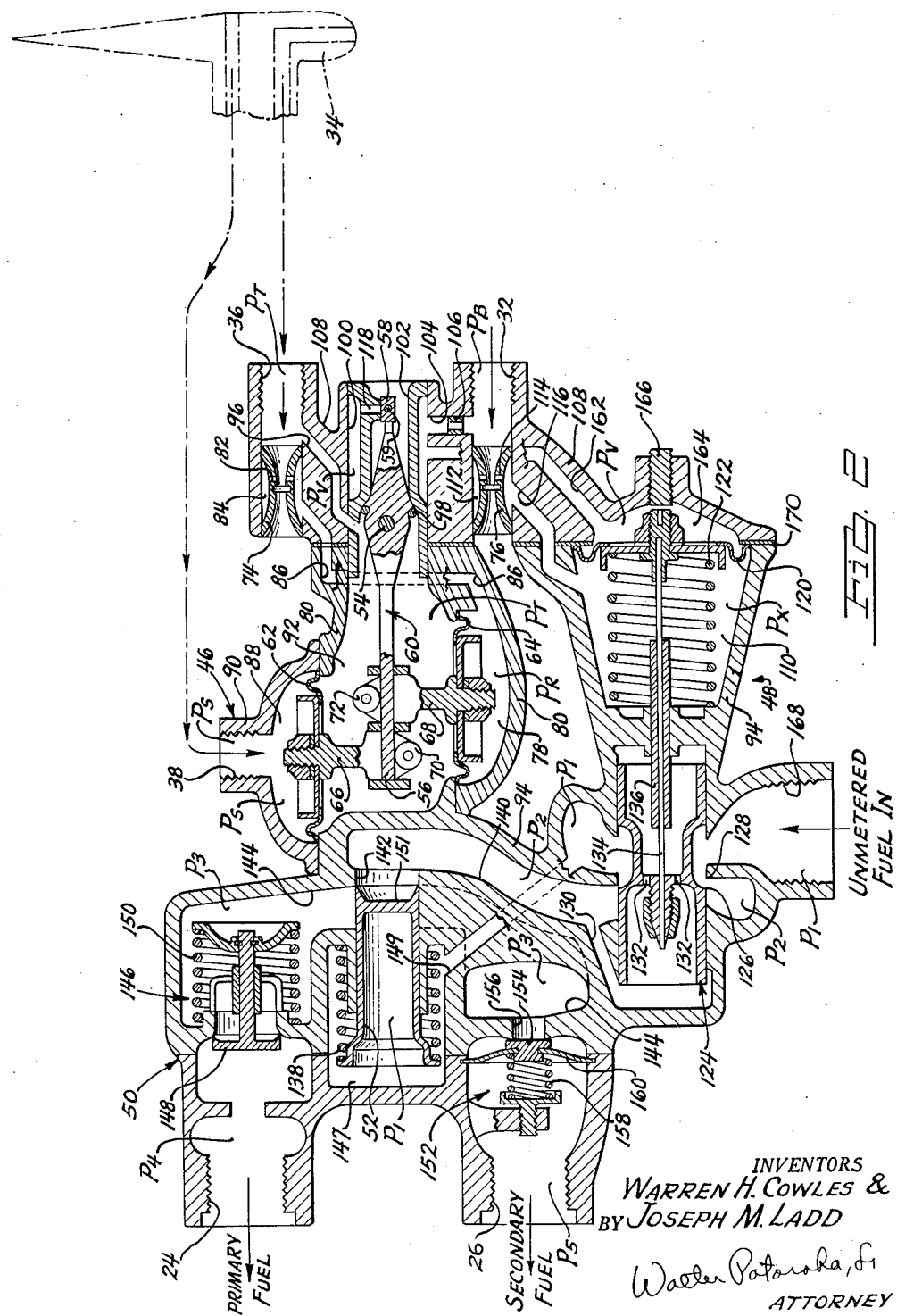
FIGURE 2 is a cross-sectional view illustrating somewhat schematically one embodiment of the invention.

FIGURE 2 illustrates generally that the fuel control 30 is basically comprised of three sections. A computer section 46 senses and appropriately reacts to certain signals of operating parameters in order to influence the operation of the main fuel metering section 48. The third section is the flow divider portion 50 which receives the metered fuel subsequently to the throttling valve 52 and divides the fuel flow to the primary 20 and secondary 22 burner rings within the ramjet engine.

A lever 60, pivotally mounted at 54, has at its opposite ends an actuating arm portion 56 and a servo valve 58 mounted on a pivotal support member 59. Diaphragms 62 and 64 are provided with extending force transmitting members 66 and 68, respectively, which are in continuous contact with the arm portion 56, as by rollers 70 and 72.

Venturi 74, located within conduit 36, has its throat pressure transmitted to chamber 78, formed generally by diaphragm 64 and the housing 80, by means of orifices 82, annular chamber 84 and conduit 86. The chamber 88, formed by diaphragm 62 and housing 90, is in communication with a source of static pressure, $Ps$, by means of conduit 38; the chamber 92 defined generally by the diaphragms 62, 64, and housings 80, 94 is in communication with a source of total ambient pressure, $Pt$, as by means of conduits 96 and 36. A suitable seal 98 may be provided about lever 60 in order to positively prevent any undesirable leaks from the chamber 92 to the atmosphere.

An annular chamber 100, formed generally by a sleeve 102 and housing 108, is in communication with conduit 32 by means of a conduit 104 which has a restriction 106 therein. The servo valve 58 is adapted to control the degree of communication between the chamber 100 and the atmosphere by controlling the flow through the sized orifice 118 formed in sleeve 102.

Venturi 76, located in conduit 32, has its throat pressure communicated to chamber 110 by means of an annular chamber 112, orifices 114 and conduit 116. The chamber 110, being formed generally by the housing 94 and diaphragm 120, contains a spring 122 which urges the diaphragm 120 to the right. A main fuel metering valve 124, having a metering edge 126 cooperating with a metering edge 128 within housing 94, is adapted to be axially positioned in accordance with certain control parameters in order to meter the proper quantity of fuel to the engine. The valve 124 is designed to be substantially hydraulically balanced by the provision of conduit 130 and orifices 132, and it is moved in accordance with the movements of diaphragm 120 by virtue of a linkage 134 which is slideably received in bushing 136.

After the fuel has been metered by valve 124, it is directed by means of conduit 140 to the throttling valve 52 which is resiliently biased in the opening direction by a spring 138. The throttling valve 52, which reacts to the pressure drop across valve 124, cooperates with an orifice 142 to control the fuel flow from conduit 140 to the general fuel manifold cavity 144. Chamber 147 which contains the spring 138 is in communication with unmetered inlet fuel pressure by means of conduit 149, whereas the throttling face 151 of valve 52 is exposed to metered fuel pressure in conduit 140. In view of this, it becomes apparent that the throttling valve 52 restricts the flow of fuel to a degree sufficient to maintain a predetermined pressure differential across the metering edges 126 and 128.

The metered fuel delivered to the manifold 144 is divided into two separate outlet paths; that is, a primary fuel outlet conduit 24 and a secondary fuel outlet conduit 26. The primary fuel conduit contains a back pressure valve 146 comprised of a valving member 148 biased towards the closed position by a spring 150. The secondary fuel conduit contains toggle type valve 152 which controls the communication between the fuel manifold 144 and conduit 26. The valve 152 is comprised generally of a valving member 154 which is urged against an orifice 156 by a compression spring 158 and a flat leaf-type toggle spring 160 which also has the added function of physically holding the member 154. The position of valve member 154 is determined by the pressure existing in the fuel manifold 144.

*Operation of Invention*

The invention as disclosed in FIGURE 2 is adapted to be employed on an unmanned guided missile. With this thought, reference to FIGURE 6 will more clearly illustrate the ultimate desired metering characteristics of such a fuel control. It will be noticed that in FIGURE 6, the ratio of fuel flow to total pressure, $Wf/Pt$, is ploted on the ordinate while Mach number is plotted on the abscissa. From this graph it can be seen that the missile is to continually accelerate until a desired Mach number is reached and then to remain at the cruising Mach number for the completion of its mission.

For purposes of illustration, let it be assumed that the missile is beginning to accelerate and is at the moment at some subsonic velocity. At this time, $Pt$ will be directed to chamber 92 while chamber 88 is at a pressure $Ps$. Pressure $Pr$ which exists in chamber 78 is some percentage of $Pt$, depending on the flow of air through venturi 74. It is evident that two different pressure differentials are created across the respective diaphragms. These pressure differentials, when combined with a proper selection of diaphragm areas and lever arm lengths, cause a counterclockwise moment of lever 60 about pivot 54, thereby seating the servo valve 58 against the servo orifice 118.

The burner pressure, $Pb$, is directed into conduit 32 and through venturi 76. Additionally, this pressure is also transmitted past restriction 106 into chamber 100, conduit 162 and chamber 164 which is formed by diaphragm 120 and housing 108. Since there is no flow past restriction 106 at this time, the pressure designated as $Pv$ will be equal to $Pb$. Pressure $Px$, the throat pressure of venturi 76, is directed to chamber 110 and adds to the biasing force of spring 122. It is of course apparent that in all cases $Pb$ or $Pv$, as the case may be, will be greater than $Px$. The maximum value that $Px$ could attain under any condition would be, of course, approximately 47% of $Pb$ due to the choked characteristics of venturi 76. An adjustable stop 166 may be provided in order that some minimum flow may be maintained past valve 124, even before diaphragm 120 starts to move the valve 124.

As burner pressure, $Pb$, and flight speed increase, pressure $Pv$ also increases, causing the diaphragm 120 and valve 124 to move further towards the left. When the venturi 76 begins to operate as a choked venturi, which will usually occur at approximately Mach one, the pressure differential of $Pv-Px$ will increase linearly with the change in burner pressure $Pb$.

Unmetered fuel at a pressure P1 is admitted to the inlet 168 and, after being metered by valve 124, drops to some lower pressure P2 in conduit 140. Since the fuel flow past valve 124 is to be a function of the effective metering orifice size, a throttling valve 52 is provided downstream of valve 124 in order to maintain a constant pressure drop across valve 124. The throttling action is accomplished by directing pressure P1 to chamber 147 and to one side of valve 52 by means of conduit 149 while exposing the throttling face 151 of valve 52 to pressure P2 in conduit 140.

When the throttled fuel pressure P3 in manifold 144 builds up sufficiently, the valve member 148 is unseated against the biasing force of spring 150, and metered primary fuel at a pressure P4 is directed into conduit 24 and the primary burner ring 20. As fuel flow increases the pressure P3 will increase, due to the restricting effect of valve member 148, until the combined forces of springs 158 and 160 are overcome. At that time, the member 154 will be moved to the left in a "snap-like" motion attributable to the toggle spring 160.

During this period of acceleration as described above, the servo valve 58 is seated on the coacting servo orifice 118. The only time that the orifice 118 is in any communication with the atmosphere is during governing, as will now be discussed.

As stated previously, ramjet engines are particularly adapted to high speed aircraft. Therefore, for purposes of illustration, let it now be assumed that the governing action is to start at a speed of Mach 3.0. The underlying philosophy of the governing function is to use a force created by the ratio of $Pt/Ps$ as an indication of Mach number and to balance this force against another force created by the ratio of $Pt/Pr$ during hypersonic flight. When the effective force of the differential $Pt-Ps$ becomes sufficient to overcome that of $Pt-Pr$, the lever 60 is rotated clockwise about pivot 54, causing servo valve 58 to become unseated and thereby allowing controlled communication between orifice 118 and the atmosphere.

When the missile approaches a velocity of Mach 3.0, the lever 60 starts to rotate and the pressure $Pv$, which previously was equal to $Pb$, is now reduced to some lesser value. As a result of this, the pressure $Pv$ in chamber 164 begins to decrease with respect to $Px$ in chamber 110, thereby causing the valve 124 to move in the closing direction. The governing action continues and valve 58 is progressively opened so as to reduce the pressure $Pv$ until there is the proper fuel flow past valve 124 to maintain governed speed.

Figure 6:
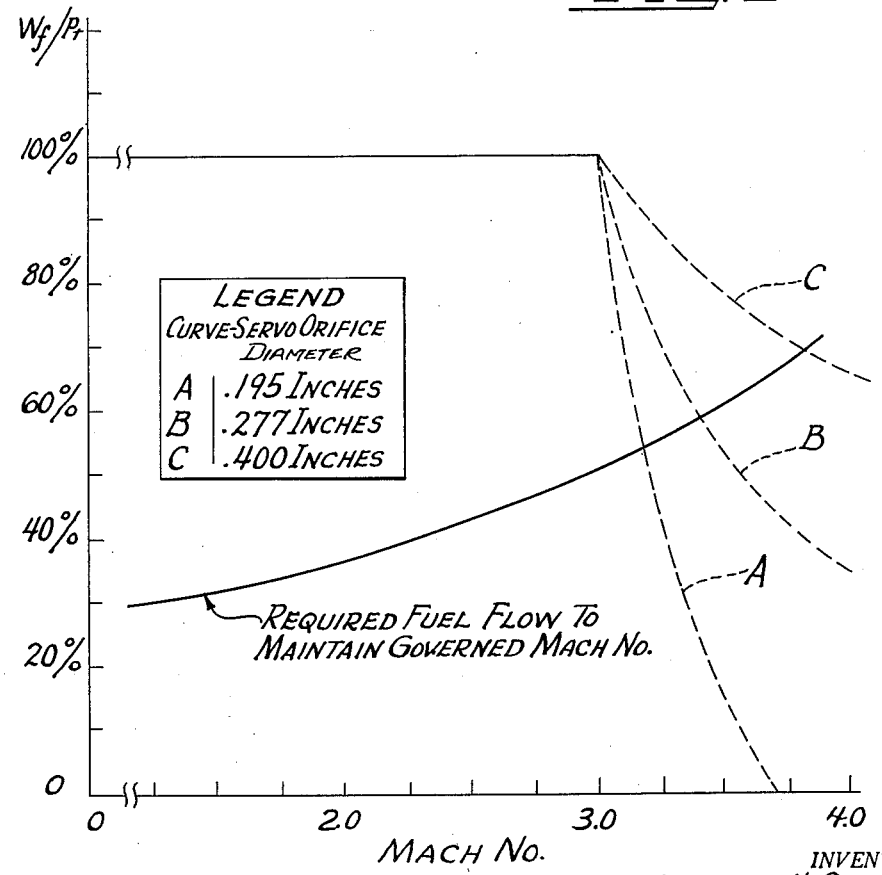
FIGURE 6 is a typical graph illustrating the fuel flow provided in pounds per hour as compared to Mach number.

From an inspection of FIGURES 2 and 6, it can be seen that the servo orifice 118 and valve 58 act as a pneumatic spring. That is, before governing occurs there is a force acting downwardly on valve 58 which is a function of $Pv$ times the cross-sectional area of orifice 118. The greatest force tending to unseat valve 58 is immediately before governing. As the system starts to undergo governing, the valve 58 is moved further away from its seat, and the force on valve 58 is diminished. It is evident that a spring rate of some sort is essential in the system; otherwise, the governing would become unstable. The effect of different orifice sizes, and consequently different spring rates, is also illustrated in FIGURE 6.

From the above, it is apparent that the governing speed can be changed by varying the lever arms of the forces acting about pivot 54. Accordingly, a shim 170 may be provided between housings 80 and 108 which will cause the lever arms of members 66 and 68 to change while maintaining the lever arm of servo valve 58 constant.

Figure 3:
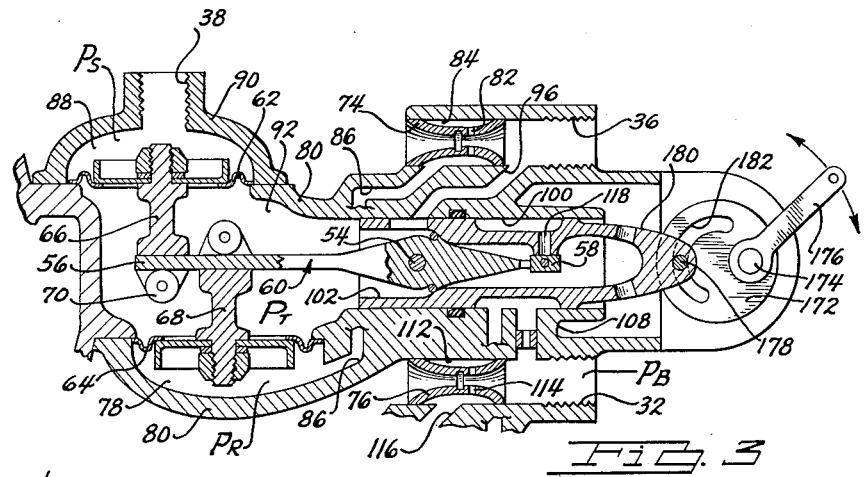
FIGURE 3 is a fragmentary view in cross-section of a modification of the invention.

FIGURE 3 illustrates a modification which is particularly adaptable to manned aircraft. The modification incorporates provisions for variably selecting a governed speed in accordance with the operator's request. All elements which are like or similar to those of FIGURE 2 are identified with like reference numbers.

In the modification of FIGURE 3, the sleeve 102 is made slideable within housing 108, and lever 60 has its pivot 54 secured to the sleeve. A bean-slotted cam 172 is pivotally mounted on a shaft 174 which also is secured to lever 176. A cam follower 178, secured to an extending portion 180 of sleeve 102, cooperates with the bean-slot 182 to move the sleeve 102 and lever 60 to the right or left, depending on the rotation of lever 176. It will be noticed that as lever 176 is rotated, the lever arm of servo valve 58 remains constant while the lever arms of members 66 and 68 have been changed. Since the governing cut-off point is a function of both the applied forces and the respective lever arms, it becomes evident that by changing the lever arms in this manner different governed speeds can be selected.

For example, during governing the system is at equilibrium, and the condition can be expressed as:

(1) $$F_1L_1 + F_3L_3 = F_2L_2$$

where:

(A) $$F_1 = (Pt-Ps)A_1L_1$$

and $A_1$ = area of diaphragm 62
$L_1$ = lever arm of $F_1$ about pivot 54

(B) $$F_2 = (Pt-Pr)A_2L_2$$

and $A_2$ = area of diaphragm 64
$L_2$ = lever arm of $F_2$ about pivot 54

(C) $\qquad F_3 = (Pv - Ps)A_3L_3$ and $A_3$ = area of orifice 118
$L_3$ = lever arm of $F_3$ on valve 58 about pivot 54

Substituting A, B and C in Equation #1:

(2) $\quad (Pt - Ps)A_1L_1 + (Pv - Ps)A_3L_3 = (Pt - Pr)A_2L_2$

Assuming the ratio of Pr to Pt to be .4 during sonic operation, expanding Equation #2 and collecting terms:

(3) $\qquad \dfrac{Pt}{Ps} = \dfrac{A_1L_1 - A_3L_3 - \dfrac{Pv}{Ps}(A_3L_3)}{A_1L_1 - .6A_2L_2}$ From this, it is apparent that by varying the respective lever arms a different governed speed can be selected.

FIGURE 4 illustrates a second modification, which also provides means for variably selecting a governed speed. In this embodiment the lever 60 is acted upon by the same forces $F_1$, $F_2$ and $F_3$ as in the previously discussed embodiments. However, in addition to these forces, a fourth variable spring force is introduced by the torsion spring 184 secured at one end to the pivot 54. A manually positioned lever 186, pivoted on shaft 188, cooperates with a looped end 190 of spring 184, as by a pin 192, in creating a variable load on the lever 60. As lever 186 is rotated counterclockwise about 188, a greater force tending to keep valve 58 seated is created, and consequently a greater governed Mach number is obtained.

FIGURE 5 illustrates, in enlarged scale, the choked venturis employed by the invention. It will be noted that the shock grooves 194 may be provided in order to both stabilize the pressure fluctuations and more rapidly bring about the characteristic of choked venturi flow, even below sonic velocity.

Although but three embodiments of the invention have been disclosed, it is apparent that other modifications are possible within the scope of the appended claims.

What we claim as our invention is:

1. In a ramjet engine fuel control having a fuel metering valve positioned in accordance with a pressure signal created by the burner pressure within said engine, governor means for limiting the quantity of metered fuel flow past said fuel metering valve, said governor means comprising a pivotally supported lever, first pressure responsive means connected to said lever and responsive to the differential of total atmospheric pressure to static atmospheric pressure, second pressure responsive means connected to said lever and responsive to the differential of total atmospheric pressure to a fixed percentage of said total atmospheric pressure, and additional means connected to said lever for limiting the magnitude of said pressure signal when the said total atmospheric pressure exceeds a predetermined value.

2. In a ramjet engine fuel control having a fuel metering valve positioned in accordance with a pressure signal created by the burner pressure with said engine, governor means for limiting the quantity of metered fuel flow past said fuel metering valve, said governor means comprising a pivotally supported lever, first pressure responsive means connected to said lever and responsive to the differential of total atmospheric pressure to static atmospheric pressure, second pressure responsive means connected to said lever and responsive to the differential of total atmospheric pressure to a fixed percentage of said total atmospheric pressure, additional means connected to said lever for limiting the magnitude of said pressure signal when the said total atmospheric pressure exceeds a predetermined value, and manual means operatively connected to said additional means for varying the said predetermined value at which said additional means becomes effective for limiting the magnitude of said pressure signal.

3. A fuel control for a ramjet engine, comprising a housing, an unmetered fuel inlet and a metered fuel outlet in said housing, a first conduit connecting said inlet with said outlet, a fuel metering valve controlling the flow of metered fuel through said first conduit, a throttling valve downstream of said metering valve for maintaining a constant pressure differential across said metering valve, means for sensing the total pressures within the burner of said engine, first pressure responsive means connected to said metering valve, said first pressure responsive means being adapted to position said metering valve so as to increase the metered fuel flow in accordance with said burner pressure, a pressure probe adapted to sense the static and total atmospheric pressures, governor means for at times limiting the metered fuel flow to said engine, said governor means comprising a second and third pressure responsive means cooperating with said housing to form first, second and third chambers therein, pivotally supported lever means operatively connected to said second and third pressure responsive means, a second conduit for directing said static atmospheric pressure to said first chamber and said second pressure responsive means, a third conduit for directing said total atmospheric pressure to said second chamber and to said second and third pressure responsive means, restriction means cooperating with said third conduit in a manner so as to create a fractional pressure of said total atmospheric pressure, a fourth conduit for directing said fractional pressure to said third chamber and said third pressure responsive means, a servo valve for controlling the effectiveness of said burner pressure, and means connecting said servo valve with said lever means so as to control the position of said servo valve in accordance with the positions of said second and third pressure responsive means.

4. A fuel control for a ramjet engine, comprising a housing, an unmetered fuel inlet and a metered fuel manifold in said housing, a first conduit connecting said inlet with said fuel manifold, at least two metered fuel outlets communicating with said fuel manifold, a fuel metering valve controlling the flow of metered fuel through said first conduit, a throttling valve downstream of said metering valve for maintaining a constant pressure differential across said metering valve, a back pressure valve in one of said metered fuel outlets adapted to create an increase in fuel pressure in said fuel manifold as the total quantity of metered fuel flow increases, a toggle acting valve in another of said metered fuel outlets adapted to remain in a substantially closed position until a predetermined fuel pressure is attained in said fuel manifold, means for sensing the total pressures within the burner of said engine, first pressure responsive means connected to said metering valve, said first pressure responsive means being adapted to position said metering valve so as to increase the metered fuel flow in accordance with the said burner pressure, a pressure probe adapted to sense the static and total atmospheric pressures, governor means for at times limiting the metered fuel flow to said engine, said governor means comprising a second and third pressure responsive means cooperating with said housing to form first, second and third chambers therein, pivotally supported lever means operatively connected to said second and third pressure responsive means, a second conduit for directing said static atmospheric pressure to said first chamber and said second pressure responsive means, a third conduit for directing said total atmospheric pressure to said second chamber and to said second and third pressure responsive means, restriction means cooperating with said third conduit in a manner so as to create a fractional pressure of said total atmospheric pressure, a fourth conduit for directing said fractional pressure to said third chamber and said third pressure responsive means, a servo valve for controlling the effectiveness of said burner pressure, and means connecting said servo valve with said lever means so as to control the position of said servo valve in accordance with the positions of said second and third pressure responsive means.

5. A fuel control for a ramjet engine, comprising a housing, an unmetered fuel inlet and a metered fuel outlet in said housing, a first conduit connecting said inlet with said outlet, a fuel metering valve controlling the flow of metered fuel through said first conduit, a throttling valve downstream of said metering valve for maintaining a constant pressure differential across said metering valve, means for sensing the total pressures within the burner of said engine, first pressure responsive means connected to said metering valve, said first pressure responsive means being adapted to position said metering valve so as to increase the metered fuel flow in accordance with the said burner pressure, a pressure probe adapted to sense the static and total atmospheric pressures, governor means for at times limiting the metered fuel flow to said engine, said governor means comprising a second and third pressure responsive means cooperating with said housing to form first, second and third chambers therein, lever means operatively connected to said second and third pressure responsive means, a pivotal support for said lever means, a second conduit for directing said static atmospheric pressure to said first chamber and said second pressure responsive means, a third conduit for directing said total atmospheric pressure to said second chamber and to said second and third pressure responsive means, restriction means cooperating with said third conduit in a manner so as to create a fractional pressure of said total atmospheric pressure, a fourth conduit for directing said fractional pressure to said third chamber and said third pressure responsive means, a servo valve for controlling the effectiveness of said burner pressure, manually adjustable means operatively connected to said pivotal support and to said servo valve for varying the relationship between said second and third pressure responsive means and said pivotal support, and means connecting said servo valve with said lever means so as to control the position of said servo valve in accordance with the positions of said second and third pressure responsive means.

6. A fuel control for a ramjet engine, comprising a housing, an unmetered fuel inlet and a metered fuel outlet in said housing, a first conduit connecting said inlet with said outlet, a fuel metering valve controlling the flow of metered fuel through said first conduit, a throttling valve downstream of said metering valve for maintaining a constant pressure differential across said metering valve, means for sensing the total pressures within the burner of said engine, first pressure responsive means connected to said metering valve, said first pressure responsive means being adapted to position said metering valve so as to increase the metered fuel flow in accordance with the said burner pressure, a pressure probe adapted to sense the static and total atmospheric pressures, governor means for at times limiting the metered fuel flow to said engine, said governor means comprising a second and third pressure responsive means cooperating with said housing to form first, second and third chambers therein, lever means operatively connected to said second and third pressure responsive means, a pivotal support for said lever means, a second conduit for directing said static atmospheric pressure to said first chamber and said second pressure responsive means, a third conduit for directing said total atmospheric pressure to said second chamber and to said second and third pressure responsive means, restriction means cooperating with said third conduit in a manner so as to create a fractional pressure of said total atmospheric pressure, a fourth conduit for directing said fractional pressure to said third chamber and said third pressure responsive means, a servo valve for controlling the effectiveness of said burner pressure when moved in the valve opening direction, means connecting said servo valve with said lever means so as to control the position of said servo valve in accordance with the positions of said second and third pressure responsive means, resilient means operatively connected to said pivotal support adapted to bias said servo valve in a valve closing direction, and additional manually controlled means for variably determining the degree of bias on said servo valve.

References Cited in the file of this patent

UNITED STATES PATENTS

| | | |
|---|---|---|
| 2,629,569 | Andrews | Feb. 24, 1953 |
| 2,712,219 | Warne | July 5, 1955 |
| 2,753,882 | Bottoms | July 10, 1956 |
| 2,804,084 | Greenland | Aug. 27, 1957 |
| 2,842,108 | Sanders | July 8, 1958 |
| 2,859,589 | Gunnarson | Nov. 11, 1958 |
| 2,861,420 | Lewis | Nov. 25, 1958 |
| 2,872,133 | Seeger | Feb. 3, 1959 |
| 2,934,898 | Graefe et al. | May 3, 1960 |